Feb. 6, 1962 A. J. SUTTON 3,019,940
FILTER DEVICE AND DISPENSING UNIT THEREFOR
Filed April 8, 1958 3 Sheets-Sheet 1
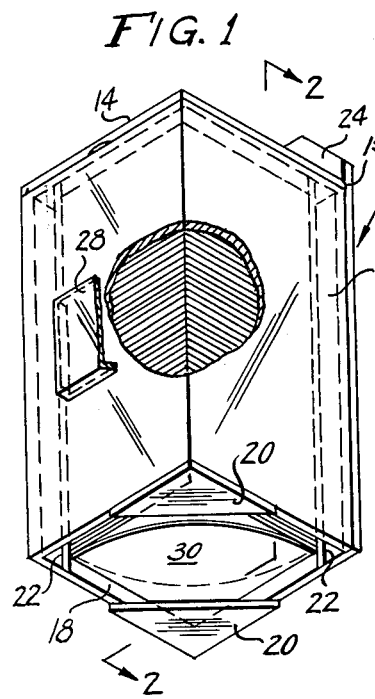
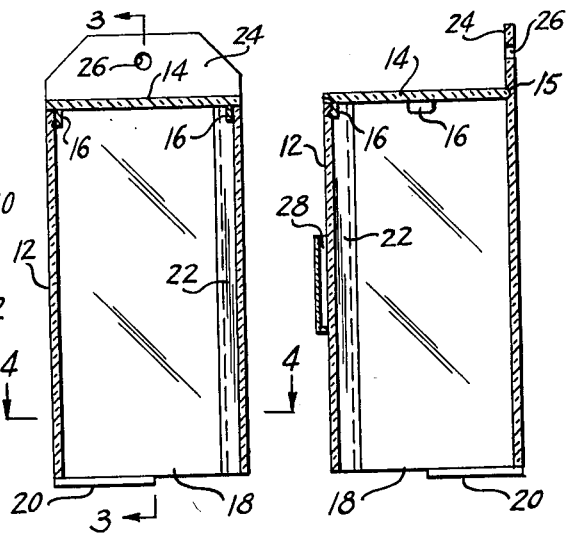
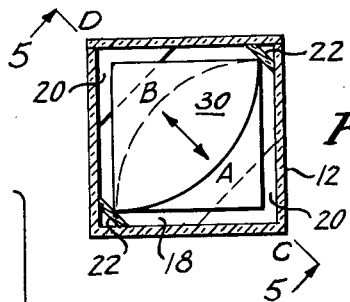
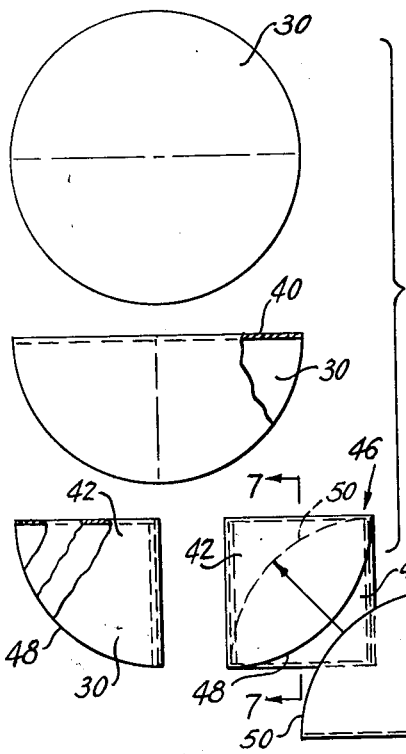
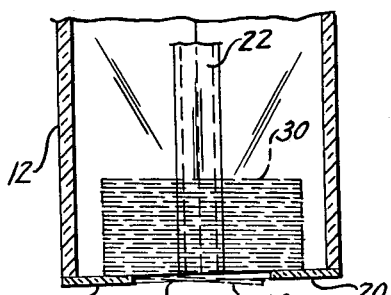
INVENTOR.
ARTHUR J. SUTTON
BY
Gustave Miller
ATTORNEY Feb. 6, 1962 — A. J. SUTTON — 3,019,940
FILTER DEVICE AND DISPENSING UNIT THEREFOR
Filed April 8, 1958 — 3 Sheets-Sheet 2
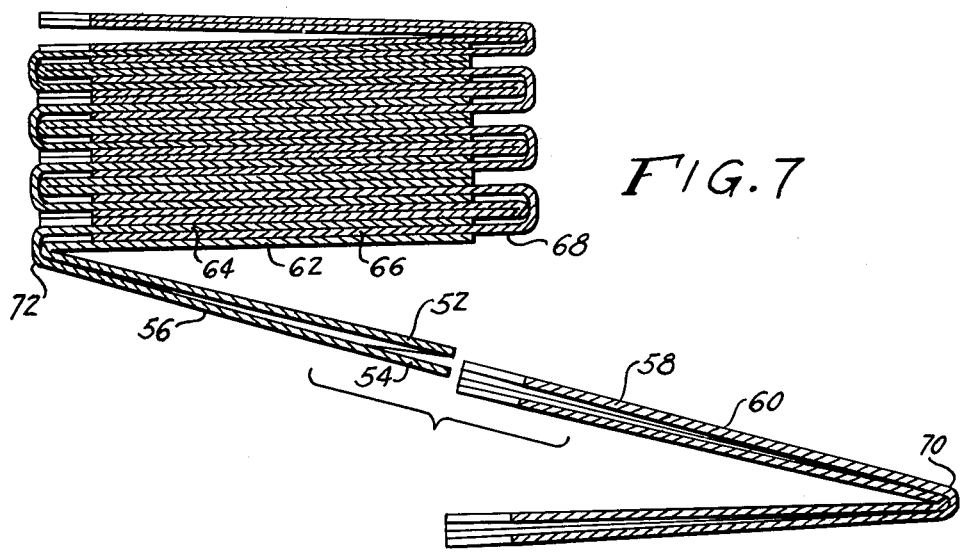
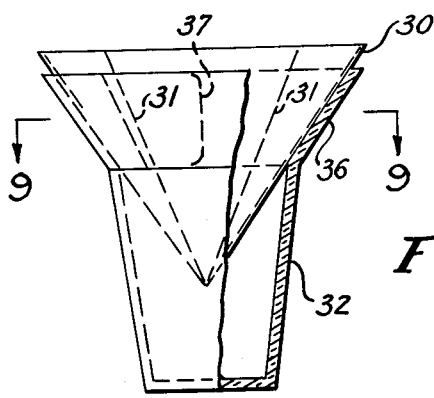
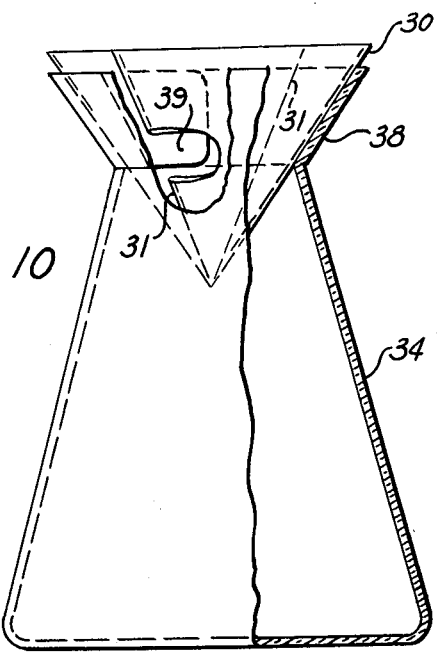
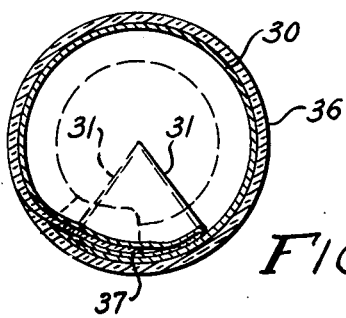
INVENTOR.
ARTHUR J. SUTTON
BY
Gustave Miller
ATTORNEY

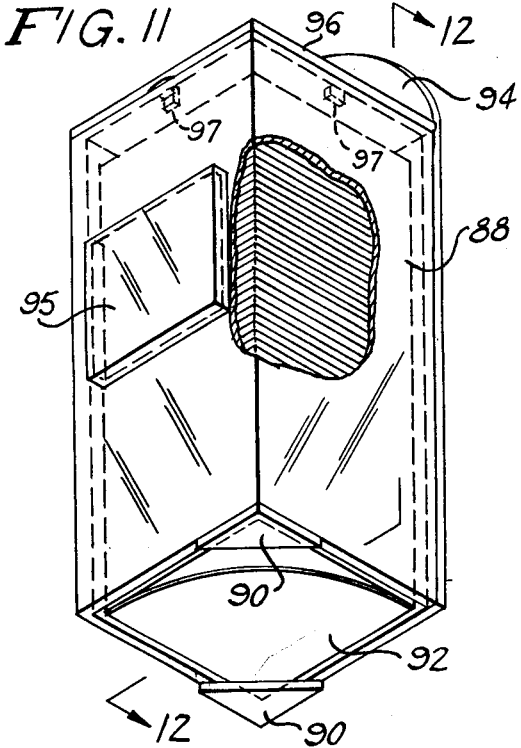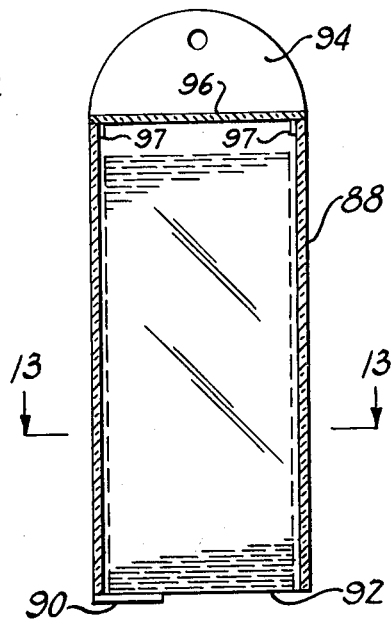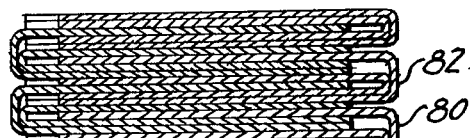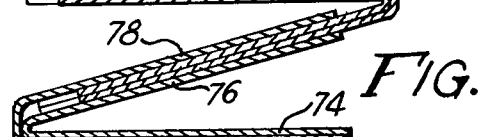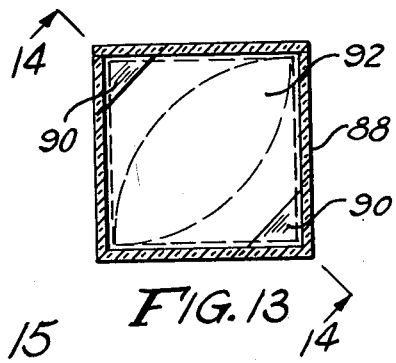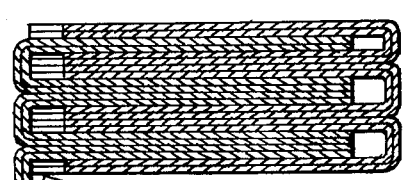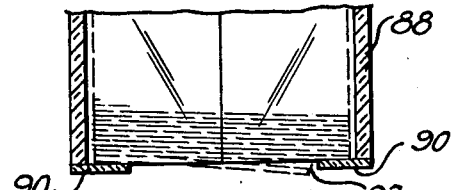

United States Patent Office 3,019,940
Patented Feb. 6, 1962

3,019,940
FILTER DEVICE AND DISPENSING UNIT THEREFOR
Arthur J. Sutton, 3536 N. Grant, Indianapolis, Ind.
Filed Apr. 8, 1958, Ser. No. 727,075
3 Claims. (Cl. 221—48)

This invention relates to funnel-shaped filter papers used in laboratory flasks or the like, and it particularly relates to the packaging and dispensing of such filter papers in an efficient and expeditious manner.

It is the general practice in most chemical or biological laboratories to effect filtration processes with the use of flasks into the mouths of which are inserted the stems of funnels. In these funnels are provided disposable paper filters of disc-like shape. This practice not only requires three different and separate items for each filtration but also requires much manipulation of these items to get them into correct position. The necessity for using so many parts, of course, increases the expense both as regards original procurement and replacement. Furthermore, the required manipulation enhances the danger of undesirable contamination of the interior of the flask and funnel and of the filter paper disc which must be manually folded and inserted into the funnel.

It is one object of the present invention to greatly decrease the dangers of contamination and reduce the expense and bother involved in the use of unduly multiplied parts by providing filter means (or units) which combine in themselves the double functions of funnel and flask and by further providing filter elements in such arrangements that they are easily accessible whenever needed without undue handling.

Another object of the present invention is to provide a dispensing unit for such filter elements which is simple in construction but effective in use.

Another object of the present invention is to provide an alternate method of dispensing filter elements which when used with a novel type flask, having corresponding and cooperative parts, forms a very effective yet simplified filter flask unit.

Other objects of the present invention are to provide improved filter means and dispensing units therefor, of the character and means described, that are easily and economically produced, which are sturdy in construction and which are highly efficient in operation.

With the above and related objects in view, this invention consists in the details of construction and combination of parts, as will be more fully understood from the following description, when read in conjunction with the accompanying drawings in which:

FIG. 1 is a bottom perspective view of a dispensing unit embodying the present invention, the dispensing unit being partly broken away to show filter units embodying the present invention in stacked arrangement therein.

FIG. 2 is a sectional view of the dispensing unit of FIG. 1 taken on line 2—2 of FIG. 1.

FIG. 3 is a sectional view taken on line 3—3 of FIG. 2.

FIG. 4 is a cross-sectional view taken on line 4—4 of FIG. 2 and showing the filter elements therein.

FIG. 5 is a sectional view taken on line 5—5 of FIG. 4.

FIG. 6 is a view showing how a filter element is folded first into halves and then quarter folds and then illustrating how such folded element is combined with another similarly folded element to form a unit for stacking.

FIG. 7 is a sectional view of a stack of filter elements as taken on line 7—7 of FIG. 6.

FIG. 8 is a view, partly in elevation and partly in section, of an assembly of a flask and filter element, each being accommodated in construction and arrangement to the other to form a novel filter combination.

FIG. 9 is a sectional view taken on line 9—9 of FIG. 8.

FIG. 10 is a view, partly in elevation and partly in section, of a second type of filter-flask assembly embodying the present invention.

FIG. 11 is a bottom perspective view, similar to FIG. 1, of a second embodiment of the dispensing unit assembly.

FIG. 12 is a sectional view of the dispensing unit of FIG. 11 as taken on line 12—12 of FIG. 11.

FIG. 13 is a cross-sectional view taken on line 13—13 of FIG. 12.

FIG. 14 is a fragmentary sectional view taken on line 14—14 of FIG. 13.

FIG. 15 is a view similar to FIG. 7 of a modified form of stacked arrangement of the filter elements.

FIG. 16 is a view, similar to FIG. 15, of a third form of stacked filter element arrangement.

Referring in greater detail to the drawings wherein similar reference characters refer to similar parts, there is shown in FIGS. 1–5 a dispensing unit, generally designated 10, which comprises a rectangular container 12, constructed of any desirable material such as glass, ceramic, plastic, wood, metal, or the like, and having an open top and bottom. The open top is closable by a lid 14 having flanges 16 frictionally engaged within the mouth of the container 12. The lid 14 has a rear edge which is adapted to extend into an indentation or recess 15 in the rear wall of the container 12. The open bottom forms a dispensing aperture 18 which is defined by two opposing corner flanges 20 extending laterally from the corresponding corners of the container 12. Within the container, extending the full length of the container, are provided a pair of inserts 22, one in each corner between the two corners from which extend flanges 20. These inserts, at their bottom ends, also define the dispensing aperture 18.

A hanger 24 extends up from one side of the container 12 and is provided with a hole 26 to accommodate a nail or hook for hanging the unit on a wall or other support. On the wall opposite that to which the hanger 24 is connected, there is provided a pocket 28 having an open top. This pocket serves as a receptacle for a replaceable paper or cardboard label designating the type of filter paper contained in the dispenser.

In use, a stack of folded filter element is inserted through the open top of container 12 and the lid 14 is then put in place. The bottom filter element of the stack is adapted to extend through the dispensing aperture 18 in the manner shown at 30 in FIG. 5. The inserts 22 are used to define a longitudinal passage through the container 12 which is of such a predetermined width as to most effectively co-act with the stack of filter elements. In this manner, the cross-sectional area of the dispenser is made slightly larger than the square shape formed by the cross-section of the stack of folded filter papers to permit freedom of vertical movement of the filter elements within the container 12 while, at the same time, the inserts 22, by providing a line contact with opposite corners of the stack (as best shown in FIG. 4) effect just sufficient frictional pressure on the stack to prevent uninhibited lateral movement of the stack.

The inserts 22 also co-act with the lateral flanges 20 to define the particular size and shape of the dispensing aperture 18. This aperture 18 has a size and shape which are dependent upon the size and nature of the filter elements 30. The width of the aperture 18 is such that the distance AD, as shown in FIG. 4, and the distance BC are slightly shorter than the diagonal dimension of the square formed by the cross section of the stack of filter elements 30. This particular proportion is necessary to effect the removal of the lowest filter elements of the stack with a minimum bending of the filter element at its apex. In this manner, creasing or weakening of the filter element during removal is prevented. In addition, these dimensions provide support at the apex of the third lowest filter element 30 in the stack, thereby preventing removal of the third lowest and higher filter elements along with the lowest filter element.

The filter elements 30 each comprise a disc of circular shape and made of standard filter paper or similar material. These discs are folded in such manner that they may be opened to form a conical shape and then inserted into a funnel such as commonly used in laboratories or into the mouth of a flask 32 such as shown in FIGURE 8 or into a flask 34 as shown in FIGURE 10. The flask 32 is provided with a conical extension 36 into which the conically shaped filter element 30 fits in a position wherein its upper end projects just above the upper end of the extension 36. In this manner there is no opportunity for seepage between the filter elements 30 and the flask extension 36, while there is adequate support for the filter element itself.

The flasks 32 and 34 may also be made in such manner that the angle which the extension 36 makes with the horizontal is less than 60 degrees. This smaller angle enables the flask to accept filter papers which have been folded to form a cone with apical angle of the cone larger than 60 degrees. Both flasks 32 and 34 are provided with a lip on the inner surface of the extension 36. The lip facilitates picking up conically prefolded filter papers from a conical stack thereof, thus presenting an alternate method of dispensing filter papers.

For example the conically folded filter papers may be stacked one on top of the other to form a cone of prefolded papers. The uppermost filter paper of the stack then presents a folded edge along its slanting surface. By placing the inverted flask 32 over the apex of the cone, and then rotating the flask, the prefolded filter paper is easily placed in position within the flask with the folded edge between the lip 37 and the extension 36. In stacking the conically folded filter papers the fold of each successive paper should not be superimposed on the previous fold, but rather should be spaced around the stack to prevent an unbalanced cone.

The flask 34 is similar to flask 32 in most details but by having a wider rather than a narrower base, it is capable of holding larger quantities. However, its extension 38 and lip 39 serve the same purposes as their corresponding parts on flask 32.

The flasks 32 and 34 may be made of glass, metal, plastic, paper, impregnated paper, etc., to meet the qualifications of the potential user. They may also be constructed of paraffined paper or some similar material of the disposable type. The open construction of the flasks make them easy to clean. If made of glass or plastic, it may be desirable to fill in the inner bottom edges to reduce crevices and facilitate cleaning. The lower portions of these flasks may also be made of transparent or translucent material and be more or less roughly calibrated to measure the exact amount of filtrate. Both flasks 32 and 34 have flat bases enabling each to stand alone in a stable position without support.

The filter elements 30 are arranged in the dispensing stack by folding each filter disc in half (as shown at 40 in FIG. 6) and is then again folded into quarters (as at 42 and 44 in FIG. 6). Then each succeeding filter element 30 in the stack is arranged one above the other in oppositely arranged fashion to form a generally square cross-sectional shape (as at 46 in FIG. 6). In this arrangement, the rounded edge 48 of filter element 42 overlaps the rounded edge 50 of filter element 44, and the interrelationship is such that each lower filter element may be removed from the others by being pulled through the aperture 18; at the same time, the next higher filter element moves into the position within the aperture 18 as illustrated in FIG. 5. There are various alternate arrangements for so stacking the filter elements as will be hereinafter described.

In FIG. 7 there is shown one manner of stacking the filter elements 30 which corresponds with the arrangements shown in FIGS. 4 and 6. In this arrangement, the two sections 52 and 54 of the lower quarter-fold of the upper filter element 56 encompass the upper section 58 of the upper quarter-fold of the next lower filter element 60, while the two sections 62 and 64 of the upper quarter-fold of the upper filter element 56 encompass the lower section 66 of the lower quarter-fold of the next higher filter element 68. The filter element 68 is then encompassed at its upper quarter-fold by the next higher filter element in the same manner as filter element 60. In this way, there are alternate layers of encompassed and encompassing filter elements, as shown in FIG. 7.

As can be seen from FIG. 7, the portion of the lowermost filter element which is adapted to project out from the aperture 18 of the dispensing container 12 has a double thickness, as indicated at 70 and 72. This lends added strength to the filter element and prevents its being easily torn when being pulled out through the aperture 18.

An alternate stacking arrangement is shown in FIG. 15 where a quarter-fold bottom filter element 74 has the two sections 76 and 78 of its upper portion engaging on either side of the two sections of the lower portion of the next higher filter element 80. The upper portion of the element 80 similarly encompasses the lower portion of the next higher element 82, etc., up to the top of the stack. In this type of stacking arrangement, there is a double thickness of each filter element between the two adjacent sections of the next lower element. This provides increased resistance to the pull when the filter elements are removed and less likelihood of tearing. It is also a somewhat simpler method of stacking.

In FIG. 16 there is shown a third arrangement wherein both sections of the upper portion of the lowest filter element 84 overlap both sections of the lower portion of the next higher filter element 86, etc., to the top of the stack. This arrangement not only provides for a double ply engagement between the adjacent portions of adjacent filter elements but also effects a sturdier and firmer squared-off engagement at the sides of the stack wherein there is a firm abutment, one against the other, at each end of the adjacent filter elements. FIGURES 7, 15, and 16 represent but three of several different, but in some respects similar methods of stacking. All of these methods possess the characteristic more or less square cross sectional pattern which is especially adapted to the dispensing unit 10. In the several methods as many as three sections of each paper may be variously interlapped with as many as three sections of the next higher paper in various combinations.

In FIGS. 11–14 there is illustrated a modified form of dispensing unit wherein the container 88 is substantially similar to container 12 but where the size of the container 88 is so determined that its cross-sectional dimension is just slightly larger than the square formed by the folded and interlapped filter elements such as shown in FIG. 6. This cross-sectional dimension should be large enough to permit the folded filter elements of the stack to fall freely within the container but small enough to act as a close guideway during such free fall. This eliminates the use of the insertions such as shown at 22 in the first form of the invention, and also practically eliminates any lateral movement of the filter elements. This type of construction permits a substantial reduction in the size of the dispensing unit and also facilitates the use of the other stacking arrangements as shown in FIGS. 15 and 16. In all other ways, the container 88 is similar to container 12 as, for example, in the provision of corner flanges 90 to define a bottom dispensing aperture 92, a hanger portion 94, an exterior receptacle 95, and a lid 96 having seating flanges 97 similar to flanges 16.

Although this invention has been described in considerable detail, such description is intended as being illustrative rather than limiting, since the invention may be variously embodied, and the scope of the invention is to be determined as claimed.

The inventor reserves the right to make minor changes not involving the functional aspects of the invention. Such a change might be exemplified by substituting a hinged lid on the dispenser.

Having thus set forth and disclosed the nature of this invention, what is claimed:

1. A filter element dispensing assembly comprising a generally rectangular vertical container having an open top closeable by a removable closure member and a dispensing aperture at its lower end, retaining elements extending across opposed corners of the rectangular opening defined by the lower margin of said container, said retaining elements providing parallel, opposed edge surfaces facing the longitudinal axis of said container, said dispensing aperture being thus defined as a parallel hexagon having a right angle at each end of its longest diagonal, a generally rectangular stack of filter elements disposed vertically within said container, said stack being supported on said retaining elements and each filter element having a free margin extending generally across one diagonal of the stack, said filter element stack being disposed in said container so that the said diagonal free margin of each of said filter elements is generally coextensive with said longest diagonal of said dispensing aperture whereby said filter elements may be grasped at their free margin and removed one-by-one through said dispensing aperture.

2. The assembly of claim 1 wherein the filter elements in the stack each comprises a circular disc folded into half-sections and then quarter-sections, with the upper quarter-section of each lower filter element interengaged with the lower quarter-section of the next higher filter element.

3. A filter element dispensing assembly comprising a generally rectangular container having a dispensing aperture at one end, retaining elements extending across opposed corners of the rectangular opening defined by the edges of said container at said one end thereof, said retaining elements providing parallel, opposed edge surfaces facing the longitudinal axis of the container, said dispensing aperture being thus defined as a parallel hexagon having a right angle at each end of its longest diagonal, a generally rectangular stack of filter elements disposed axially within said container, each filter element having a free margin extending generally across one diagonal of the stack, said filter element stack being disposed in said container so that the said diagonal free margin of each of said filter elements is generally coextensive with said longest diagonal of said dispensing aperture whereby said filter elements may be grasped at their free margin and removed one-by-one through said dispensing aperture.

References Cited in the file of this patent

UNITED STATES PATENTS

| | | |
|---|---|---|
| 43,193 | Geer | June 21, 1864 |
| 514,426 | Outerbridge | Feb. 6, 1894 |
| 1,164,047 | Winter | Dec. 14, 1915 |
| 1,236,055 | Cohn | Aug. 7, 1917 |
| 1,593,532 | Hansen | July 20, 1926 |
| 1,611,131 | McCorkindale | Dec. 14, 1926 |
| 1,692,463 | Merrin | Nov. 20, 1928 |
| 1,792,087 | Groff | Feb. 10, 1931 |
| 2,092,167 | Kettles | Sept. 7, 1937 |
| 2,101,579 | Hamer | Dec. 7, 1937 |
| 2,295,005 | Peacock et al. | Sept. 8, 1942 |